United States Patent [19]

Popper et al.

[11] 4,073,747
[45] Feb. 14, 1978

[54] REGENERATION OF SPENT ACTIVATED CARBON WITH FORMALDEHYDE

[75] Inventors: Karel Popper, Danville; Wayne M. Camirand, El Cerrito; Gerald S. Williams, Richmond; Edward P. Mecchi, Lafayette, all of Calif.

[73] Assignee: The United States of America as represented by the Secretary of Agriculture, Washington, D.C.

[21] Appl. No.: 750,340

[22] Filed: Dec. 13, 1976

[51] Int. Cl.² ............................................. B01J 21/20
[52] U.S. Cl. .................................... 252/412; 210/32; 210/40; 252/414
[58] Field of Search ................... 252/412, 411 R, 414; 210/39, 40, 30, 32; 423/486

[56] References Cited

U.S. PATENT DOCUMENTS 3,714,040   1/1973   Jordon et al. .................... 423/486

FOREIGN PATENT DOCUMENTS 2,129,459   1/1973   Germany ........................ 252/411 R Primary Examiner—Winston A. Douglas
Assistant Examiner—P. E. Konopka
Attorney, Agent, or Firm—M. Howard Silverstein; David G. McConnell; Theodore J. Leitereg

[57] ABSTRACT

Spent activated carbon is regenerated by contacting it with formaldehyde in an amount sufficient to restore its activation. Following the treatment the regenerated carbon is rinsed to remove residual formaldehyde and is then ready for use.

2 Claims, No Drawings

REGENERATION OF SPENT ACTIVATED CARBON WITH FORMALDEHYDE

BACKGROUND OF THE INVENTION

1. Field of the Invention

This invention relates to and has among its objects the regeneration of carbon which has lost its activity through use. Further objects of the invention will be obvious from the following description wherein parts and percentages are by weight unless otherwise specified.

2. Description of the Prior Art

Activated carbon enjoys many uses because of its reductive and sorbant properties. For example, activated carbon is employed in purification and separation processes such as sugar refining, wine treatments, air conditioning, purification of oils and fats, sewage treatments, purification of solvents, and the like. Generally, activated carbon is packed in a column and the material to be purified is passed therethrough; however, batchwise use of activated carbon is still carried on in many areas.

When the activated carbon has lost its reductive and sorbant properties through use, i.e., when it has become "spent," it is replaced with fresh activated carbon. The spent carbon is then either discarded or regenerated. Discarding the spent carbon is wasteful and oftentimes harmful to the environment.

Spent carbon may be regenerated by heating at high temperatures in the absence of air and then quenching the carbon with water. This method of regeneration is expensive because it is a time-consuming and laborious task and because it consumes a large amount of energy. Furthermore, loss of activated carbon material, exceeding five percent in some instances, is encountered.

SUMMARY OF THE INVENTION

The invention described herein provides a means for regenerating spent carbon without the disadvantages described above. In the process of the invention spent carbon is contacted with formaldehyde for a period long enough to restore the activity of the carbon. Then, the regenerated activated carbon is separated from the formaldehyde and treated to remove residual formaldehyde therefrom.

One advantage of the invention is that it conserves energy. No heat is required in the instant process. A further point is that contamination of the air which occurs in thermal regeneration is avoided.

Another important advantage of the invention is that it can be practiced *in situ* without disturbing the physical set-up, for example, a column packed with activated carbon, of a particular purification or separation procedure.

Another advantage of the invention is its simplicity coupled with its ease of operation. Spent carbon is contacted with formaldehyde, rinsed free of resiudal formaldehyde, and is ready for use. No other steps are required.

DESCRIPTION OF THE PREFERRED EMBODIMENTS

In regenerating spent carbon in accordance with the invention, one proceeds first by contacting the spent carbon with formaldehyde. Contact between the spent carbon and formaldehyde can be achieved in a number of ways. For example, if the spent carbon is contained in a column, formaldehyde can be passed through the column until the carbon is regenerated. The point of regeneration is easily determined by monitoring the liquid exiting from the column. Prior to total regeneration of the carbon, formic acid is produced and exits the column. After the carbon has been fully regenerated, formic acid is no longer formed and formaldehyde again is detected. The time of contact between the formaldehyde and the spent carbon depends on the nature and extent of deactivation of the carbon. Generally, regeneration of the carbon can be achieved in about 0.5 to 2 hours. The amount of formaldehyde to be used is about from 0.1 to 5 percent, based on the weight of spent carbon. In any event, as mentioned above, the amount of formaldehyde used and the time of contact are adjusted so as to achieve maximum regeneration of the spent carbon.

After treatment with formaldehyde the regenerated activated carbon is treated to remove excess formaldehyde therefrom. Usually, the regenerated carbon is washed with water to secure formaldehyde removal. Generally, about 0.5 to 5 parts of water per part of carbon is used. Following this step the regenerated carbon is ready for use.

EXAMPLE

The invention is further demonstrated by the following illustrative example.

A column 4 feet in diameter and 6 feet in length was packed with 3300 pounds of activated carbon.

Approximately 7.3 million gallons of effluent, i.e., sewage processed by a secondary biological process and by reverse osmosis after heavy chlorination wherein most of the chlorine passed the reverse osmosis cellulose acetate membrane, was passed through the column. At that point the activated carbon had become spent as indicated by the fact that chlorine was no longer being converted to chloride ion by the carbon. Formaldehyde was then percolated through the column and the percolate was monitored by its odor. After 60 pounds of 30% formaldehyde was passed through the column, formic acid was no longer detected and the presence of formaldehyde was evident.

The regenerated carbon was rinsed with 200 gallons of water and again subjected to passage of effluent. Chloride ion was detected by means of colorimetry after the effluent was passed through the column, thus indicating that the carbon had indeed been regenerated. (Chloride ion is formed by reduction of chlorine present in the effluent by the regenerated carbon.)

Having thus described our invention, we claim:

1. A process for regenerating spent carbon, which comprises
    contacting the spent carbon with an aqueous solution of formaldehyde in an amount sufficient to and for a period long enough to regenerate the carbon and
    removing the aqueous solution of formaldehyde from the regenerated carbon.

2. The process of claim 1 wherein the regenerated carbon is rinsed with water to remove residual formaldehyde.

* * * * *